United States Patent [19]

Hattori et al.

[11] Patent Number: 4,843,555

[45] Date of Patent: Jun. 27, 1989

[54] SIGNAL PROCESSING SYSTEM FOR VEHICULAR ACCELERATION SENSOR

[75] Inventors: Toshihiro Hattori, Ayase; Masaki Ishihara, Fujisawa; Hitoshi Kasai; Yasuyoshi Asagi, both of Kawasaki, all of Japan

[73] Assignees: Isuzu Motors Limited, Tokyo; Fujitsu Limited, Kawasaki, both of Japan

[21] Appl. No.: 97,399

[22] Filed: Sep. 16, 1987

Related U.S. Application Data

[63] Continuation of Ser. No. 686,544, Dec. 26, 1984, abandoned.

[51] Int. Cl.⁴ .................. G06F 3/00; G06F 15/353; F02D 41/10
[52] U.S. Cl. .................. 364/431.07; 123/416; 123/492; 123/494
[58] Field of Search ............... 123/349, 350, 415, 416, 123/445, 478, 399, 492, 494; 318/417, 420, 428; 364/424, 426, 431.07

[56] References Cited

U.S. PATENT DOCUMENTS

| | | | |
|---|---|---|---|
| 3,898,962 | 8/1975 | Honig et al. | 123/492 |
| 4,121,545 | 10/1978 | Mizote | 123/494 |
| 4,159,697 | 7/1979 | Sweet | 123/492 |
| 4,346,776 | 8/1982 | Taplin | 364/426 |
| 4,389,910 | 6/1983 | Lockhart | 364/424.1 |
| 4,430,975 | 2/1984 | Ishida et al. | 123/399 |
| 4,470,396 | 9/1984 | Hasumi et al. | 123/478 |
| 4,502,437 | 3/1985 | Voss | 123/494 |
| 4,515,009 | 5/1985 | Hasegawa et al. | 123/478 |
| 4,541,052 | 9/1985 | McCulloch | 364/431.07 |

FOREIGN PATENT DOCUMENTS

| | | | |
|---|---|---|---|
| 0077527 | 6/1981 | Japan | 123/494 |
| 0093936 | 6/1983 | Japan | 123/494 |

OTHER PUBLICATIONS

J. Stoer and R. Bulirsch, Introduction to Numerical Analysis, 1980, by Springer-Verlag, New York, Inc., pp. 37-72.

Primary Examiner—Felix D. Gruber
Assistant Examiner—Ngoc Pham
Attorney, Agent, or Firm—Staas & Halsey

[57] ABSTRACT

Herein disclosed is a signal processing system for a motor vehicle with high responsiveness to the will of a driver. The output voltage of an acceleration sensor using a potentiometer is converted into a digital value by an analog-digital converter. The nonlinearity of the output voltage is corrected by polynominally calculating the digital value. This digital value is controlled by a central processing unit which processes the digital value to generate an acceleration signal having a linear relationship to the changes in the resistance of the potentiometer during actuation of an accelerator. The central processing unit further includes a memory for storing the acceleration signal at an idling position to determine a calibrated acceleration signal using a ratio of an actual acceleration signal obtained from the accelerator pedal to the stored value thereof.

6 Claims, 3 Drawing Sheets

SIGNAL PROCESSING SYSTEM FOR VEHICULAR ACCELERATION SENSOR

This is a continuation of co-pending application Ser. No. 686,544 filed on 12/26/84, abandoned.

BACKGROUND OF THE INVENTION

1. Field of the Invention

The present invention relates to an acceleration control device for a motor vehicle and, more particularly, to a signal processing system for correcting the output voltage of a sensor which is associated with an accelerator such as an accelerator pedal of the motor vehicle for outputting depression of the accelerator pedal in terms of changes in the resistance thereof.

2. Description of the Related Art

In recent years, introduction of electronic techniques into control of a motor vehicle has progressed so far that a variety of mechanically controlled parts are being replaced by electronically controlled ones. In order to use this type of electronic control, displacements or the like of the respective parts have to be converted into electric signals so that sensors can be used with those parts. Of these, for example, an acceleration sensor is used with the accelerator pedal so as to detect a driver's actuation or depression of the pedal. The output signal of the acceleration sensor will be termed herein as "an acceleration signal", and is used to control the throttle of an internal combustion engine, a clutch attached thereto along with timing of a speed change for an automatic transmission and so forth. Thus, the acceleration signal is used for most of the controls of the drive power train of the vehicle so that its accuracy has a direct effect on and important relationship with the performance of the engine.

In the acceleration control device of the prior art, however, the acceleration signal has such nonlinear characteristics with respect the angle of the sensor when using a potentiometer, i.e., during the depression of the accelerator pedal. In other words, the sensor fails to have an angle of deflection which is in a linear relationship with the output voltage thereof.

Since the sensors are mass-produced and have their resistances dispersed over a range, moreover, the above-mentioned engine control signal characteristics require that the output voltages of the sensors be set at a zero point when the accelerator pedal is released or not depressed. As a result, the nonlinear characteristics among sensors are dispersed over a range.

The quantities to be controlled thus fail to change linearly with the depression of the accelerator pedal by the driver. As a result, the relationship of the pedal depression with the throttle opening of the engine and the speed change timing of the transmission are changed to produce a disadvantage in that the drivability or driving feeling of the vehicle is degraded. Since these characteristics are different between the respective vehicles, the drivability or driving feeling becomes even worse. At the same time, the output voltages during idling and at the maximum depression of the accelerator pedal are different among the sensors thereby causing another disadvantage in that an insensitive range is caused at the depression side thereby enlarging the range of dispersion. This results in the respective vehicles being different in the throttle opening and/or the speed change timing for a pedal depression which is the same thereby causing still another disadvantage in that the vehicles do not produce a common performance.

In order to eliminate the above disadvantages, it is a current practice to extract the signal of the sensor from three terminals, i.e., two terminals of a fixed resistance and one terminal of a sliding contact so that the potential of the sliding contact may be outputted as a divided voltage between the two terminals of the fixed resistance. However, this current practice has a further disadvantage in that the wiring is accordingly complicated and raises the production cost.

SUMMARY OF THE INVENTION

It is an object of the present invention to provide a signal processing system for use with a motor vehicle, which controls the the vehicle with high responsiveness to the will of a driver.

Another object of the present invention is to provide a signal processing system of the above type, which easily corrects the nonlinear characteristics of an acceleration sensor which uses a potentiometer.

Still another object of the present invention is to provide a signal processing system of the above type, which corrects dispersion of the characteristics of the potentiometer.

A further object of the present invention is to provide a signal processing system of the above type, which has its wiring simplified so that it can be produced at a reasonable cost.

According to the present invention, the output voltage of an acceleration sensor using a potentiometer is converted into a digital value by an analog-to-digital converter, and the nonlinearity of the signal is corrected by either linearly interpolating or polynominally calculating the digital values. For this polynominal calculation, the sensor output voltage is converted into the resistance of a potentiometer having a linearity with respect to the angle of deflection of the sensor so that linearity is improved.

According to another aspect of the present invention, the open or released state of the accelerator is detected, and the digital value of the output voltage of the sensor in the released state is stored so that the acceleration signal may be obtained on the basis of the ratio of the digital value of another output voltage to the stored value. Thus, dispersion of the acceleration signal in relation to the actuation of the accelerator due to dispersion of the intrinsic resistance of the potentiometer can be eliminated.

According to the present invention, there is provided a signal processing system for controlling a motor vehicle with high fidelity responsiveness to the will of a driver and including an acceleration sensor having a potentiometer for outputting an analog output voltage according to changes in its resistance depending nonlinearly upon actuation of an acceleration. Also included are an analog-to-digital converter for converting the analog output voltage of the sensor into a digital output voltage and a central processing unit for controlling the digital output voltage of the analog-digital converter. The central processing unit including means for processing the digital output voltage of said analog-digital converter to generate an acceleration signal in linear relationship to the changes in the resistance of said potentiometer during the actuation of said accelerator.

BRIEF DESCRIPTION OF THE DRAWINGS

Other objects, features and advantages of the present invention will become apparent from the following description taken in conjunction with the embodiment thereof with reference to the accompanying drawings, in which.

DESCRIPTION OF THE PREFERRED EMBODIMENT

Figure 1:
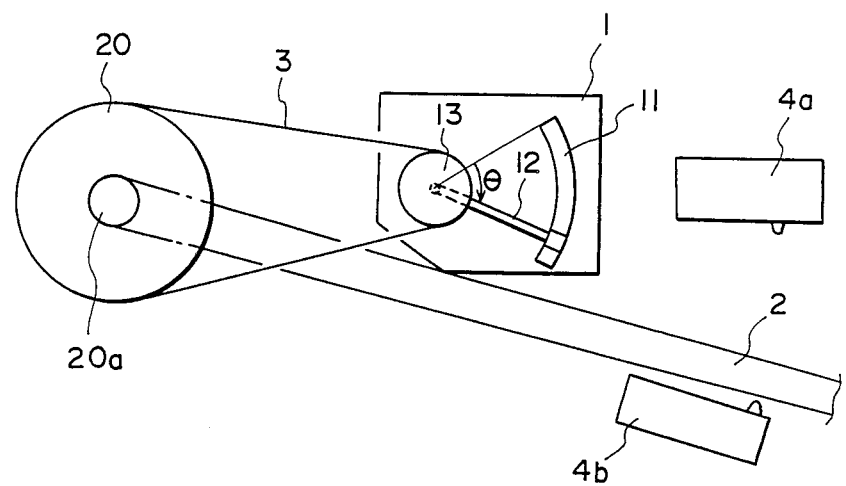
FIG. 1 is a schematic view showing the construction of an accelerator pedal sensor to be incorporated into a signal processing system according to the present invention.

With reference to FIG. 1, there is fixed on a shaft 20a of an accelerator pedal 2 a pulley 20, through which is driven an acceleration sensor 1. This sensor 1 is constructed using a potentiometer having a variable resistance which is composed of a fixed resistance 11 with a resistance at a fixed value and a sliding contact 12. This sliding contact 12 has one end fixed on a (not-numbered) shaft of a pulley 13 having a small diameter, so that it is caused to slide on the fixed resistance 11 when the rotation of the pulley 20 is transmitted to the pulley 13 through an endless belt 3. The resistance R1, between the sliding contact 12 and the ground changes in proportion to a rotation angle of the sliding contact 12. This potentiometer is widely used because of its high resolution and low production cost and can meter the depression (i.e., deflection) of the accelerator pedal 2 in terms of an electric signal such as an output voltage. Indicated at reference character 4a is an idle switch which is so positioned above the accelerator pedal 2 that it is turned on when the pedal 2 is released, allowing to detection of the idling state. Indicated at character 4b is a WOT switch which is positioned below the accelerator pedal 2 so that it is turned on when the pedal 2 is depressed to its maximum stroke. Thus, the accelerator pedal 2 can be depressed or deflected between the two switches 4a and 4b so that the sliding contact 12 is deflected or turned at an angle $\theta$ in proportion to the ratio between the diameters of the pulleys 20 and 13.

Incidentally, the sliding contact 12 can be connected directly to the shaft 20a of the accelerator pedal 2 so that it can be deflected as the shaft 20a rotates.

Figure 2:
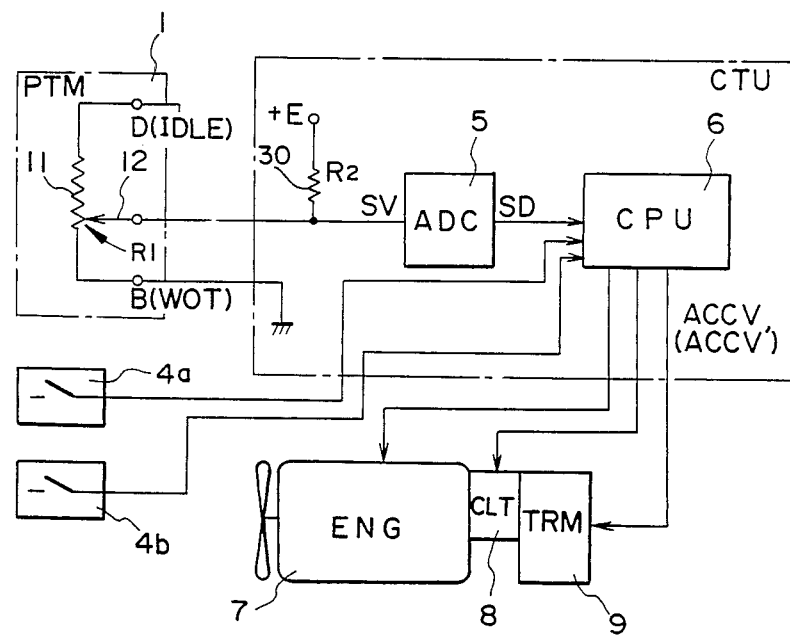
FIG. 2 is a block diagram showing the signal processing system according to one embodiment of the present invention.
Figure 1:
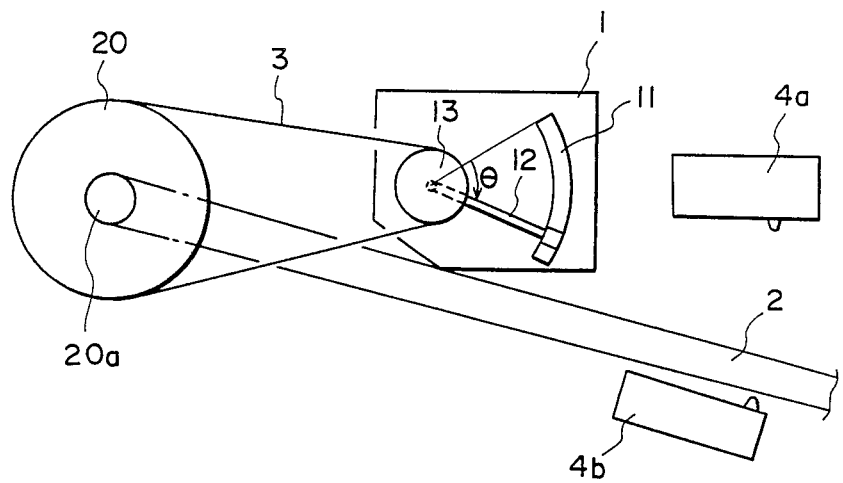
Figure 2:
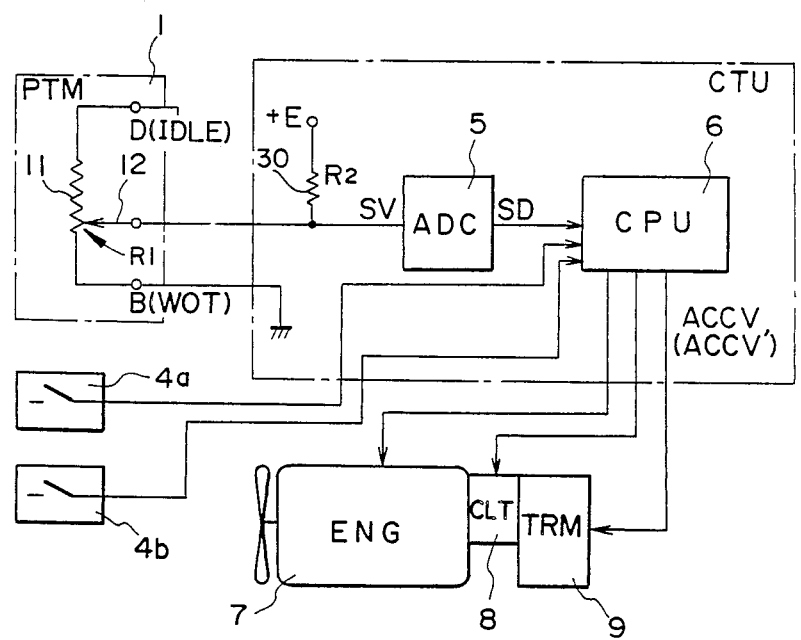

Turning to FIG. 2 showing the signal processing system of the present invention in a block diagram, the acceleration sensor 1 has one terminal B (at the WOT side) connected to the ground and its sliding contact 12 connected with a power supply E through a fixed resistance 30 having a fixed resistance value R2. A potential SV in accordance with to the position of the sliding contact 12 of the sensor 1 is converted into a digital value SD by the action of an analog-digital converter (which will be shortly referred to as an AD converter) 5 of a control unit CTU so that the digital value SD is input to a processor (i.e., a central processing unit) 6. This processor 6 is equipped with means for processing the digital value SD into an acceleration signal to control the throttle opening of an internal combustion engine (ENG) 7, to apply or release a clutch (CLT) 8, or to time the speed change of an automatic transmission (TRM) 9, thus controlling the engine 7, the clutch 8 and the transmission 9.

In addition, the sensor 1 has its fixed resistance 11 opened at its idle terminal D so that it is connected with the control unit CTU through two lines. The first line is coupled to AD converter 5, and the second line is coupled to ground. As a result, the maximum resistance, i.e., the maximum output voltage is attained when the slide 12 is at the idle terminal D whereas the minimum resistance, i.e., the minimum output voltage is attained when the slide 12 is at the WOT terminal B. Even if the sensor 1 and the control unit CTU are disconnected, the processor 6 can determine that the accelerator pedal is released, because it is fed with the highest voltage at the idle side, so that the eninge 7 will not run away.

More specifically, the voltage to be input to the AD converter 5 is expressed by the following equation:

$$SV = E \times R1/(R1+R2) \text{ (volts) (1)}.$$

Here, if the output of the AD converter 5 is in a unit of 10 mV, the output SD of the AD converter 5 is expressed by the following equation:

$$SD = 10 \times E \times R1/(R1+R2) \text{ (mv) (2)}.$$

Next, the processor 6 corrects the output SD for linearization according to the present invention. As previously mentioned, the resistance R1 is linear with respect to the angle of deflection $\Theta$ of the sliding contact 12 in sensor 1. For this linearization, specifically, the equation (2) may be transformed to determine the resistance R1 of the sensor 1

$$R1 = R2 \times SD/(10 \times E - SD) \text{ (3)}.$$

The actual acceleration signal ACCV can be expressed by multiplying it by a constant C, as follows:

$$ACCV = C \times R2 \times SD/(10 \times E - SD) \text{ (4)}.$$

Hence, the processing means of the processor 6 can produce the acceleration signal ACCV if it calculates the equation (4).

Figure 3:
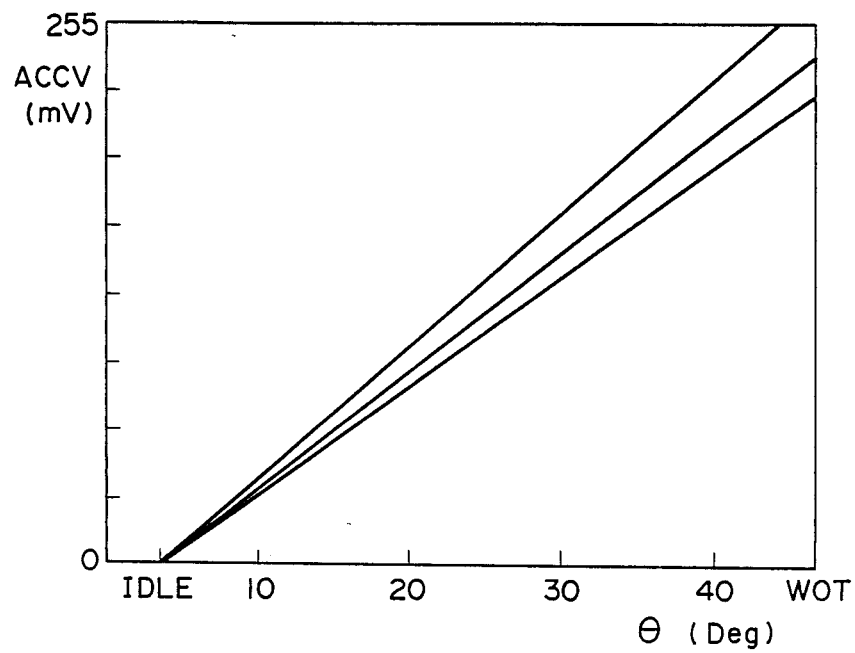
FIG. 3 is a graph plotting the acceleration signal against the deflection angle of the accelerator pedal sensor for explaining the linearity therebetween obtained by the signal processing system of the present invention.

Reference will be had to FIG. 3 depicting the characteristics of the acceleration signal ACCV thus obtained by the linearizing correction of the present invention and plotted against the deflection angle $\theta$ of the acceleration sensor. From FIG. 3, it is apparent that the desired linearity of the acceleration signal ACCV is attained. Here, in FIG. 3, the acceleration signal ACCV is plotted to increase in accordance with the increase in the sensor deflection angle $\theta$.

Next, another feature of the present invention for calibrating the input voltage signal dispersed due to the dispersion of the resistances of the sensors will be described below.

Figure 4:
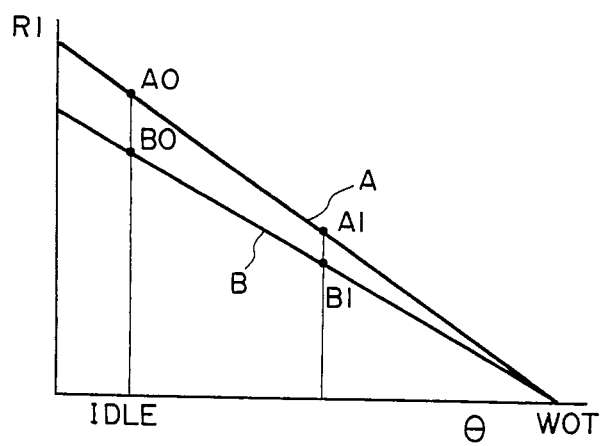
FIG. 4 is a graph plotting the resistance of a potentiometer used in the accelerator pedal sensor of FIG. 1 against the angle of deflection of the same sensor for explaining the calibration of the accelerator pedal sensor.

In FIG. 4, a straight line A shows an ideal characteristic of a rotational angle Θ of the accelerator sensor 1 and a resistance value R1 of the resistance 11 and a straight line B shows an actual characteristic of the rotational angle Θ of the accelerator sensor 1 and a resistance value R1 when the resistance 11 has a dispersed value. The acceleration sensor 1 is adjusted so that the resistance R1 of the resistance 11 has a zero value at the maximum depression of the accelerator pedal, the dispersion of the resistance 11 is depicted in FIG. 4. With closer reference to FIG. 4, specifically, it is assumed that a characteristic straight line B is different from an ideal line (i.e., a designed characteristic line) A, as the sensor resistance R1 is plotted against the sensor deflection angle $\theta$. As shown in FIG. 4 the actual resistance of resistance 11 detected (i.e., the linearly corrected output value SD of the AD converter 5) when the idle switch 4a is turned on is designated at B0 whereas its corresponding ideal resistance value is designated at A0; and the actual resistance value detected when the accelerator pedal 2 is depressed to a certain extent is designated at B1 whereas its corresponding ideal resistance value is designated at A1. Then, this ideal resistance value A1 is expressed by the following equation:

$$A1 = B1 \times (A0/B0) \quad (5).$$

Hence, no matter what resistance value the resistance 11 of the accelerator sensor 1 might take, the straight line B can be calibrated to the straight line A by the use of the equation (5) by detecting and storing the resistance value B0 at the idling position if the calibration is such that the straight lines have an inflection point of the resistance value 0 at the maximum depression of the accelerator pedal.

In an actual application, since the acceleration signal is calculated such that the acceleration signal ACCV increases in proportion to the increase of the sensor deflection angle $\theta$, as shown in FIG. 3, it is desirable to use the following equation for the calibrated straight line for A0=255, if the maximum output of the processor 6 is assumed to be "255 (the maximum value of 8 bits)":

$$\begin{aligned} A1' &= 255 - A1 \\ &= 255 - B1 \times (255/B0) \end{aligned} \quad (6)$$

where A1' is the difference between A0(255) and A1.

Figure 5:
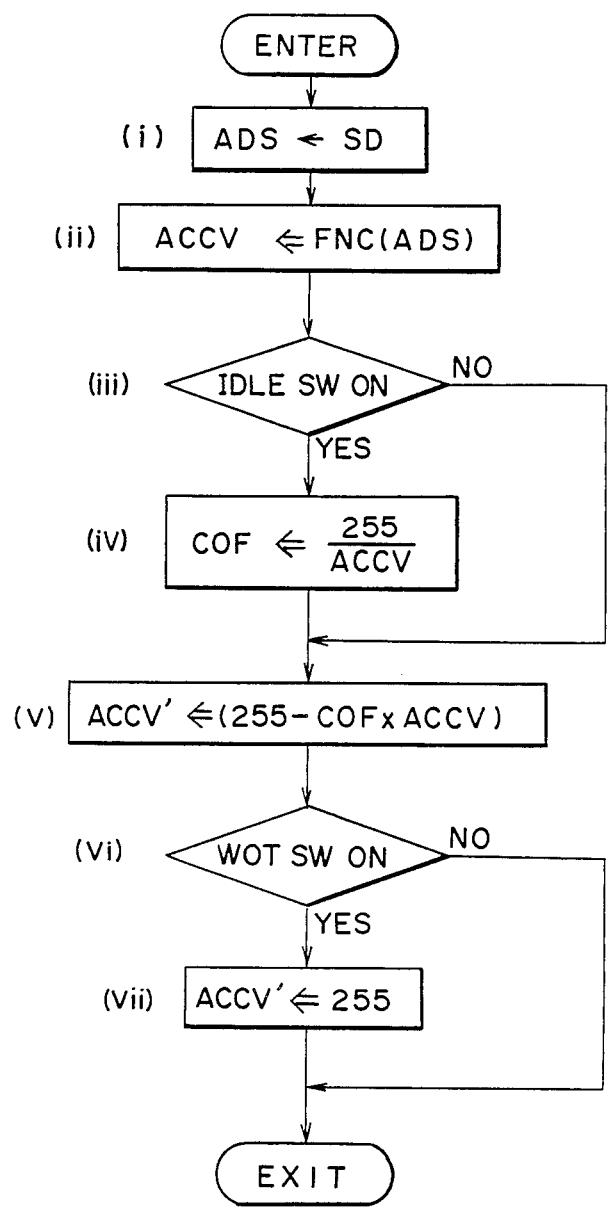
FIG. 5 is a flow chart for explaining a process for eliminating dispersion of the acceleration signal during the depression of the accelerator pedal.

This calibration will be described more specifically with reference to FIG. 5.

(i) At first, the output SD of the AD converter 5 is stored as ADS in a built-in memory of the processor 6.

(ii) Next, the processor 6 executes the calculation of the equation (4) by substituting the memory signal ADS into the digital value SD of the equation (4) to determine the acceleration signal ACCV. As a result, the linearization correction is ended to determine resistance value R1 corresponding to the resistance 11 of the sensor 1.

(iii) Then, the processor 6 detects whether the idle switch 4a is turned on.

(iv) If the idle switch 4a is detected as turned on, a calibration coefficient COF (i.e. 255/B0) is expressed from the acceleration signal ACCV at this time by the following equation because the acceleration value ACCV corresponding to B0 of the equation (6):

$$COF = 255/ACCV \quad (7).$$

The processor 6 calculates this to determine the correction coefficient COF and stores it in its memory for a subsequent calibration.

(v) After this calculation, or if it is detected that the idle switch 4a is not turned on, the processor 6 calculates a calibrated acceleration signal ACCV' on the basis of equation (8), which is transformed from the equation (6) by using the correction COF instead of (255/B0):

$$ACCV' = 255 - COF \times ACCV \quad (8)$$

Next, the processor 6 executes the WOT calibration. Specifically, when the WOT switch 4b is turned on (i.e., when the accelerator pedal 2 is depressed to its full stroke), the calibrated accelerator signal ACCV' is forced to take its maximum value (i.e., 255).

(vi) More specifically, the processor 6 detects whether the WOT switch 4b is turned on.

(vii) If this switch 4b is detected as turned on, the processor 6 sets the calibrated acceleration signal ACCV' at the maximum (i.e., 255) irrespective of the calculated result of the foregoing equation (8).

If it is detected that the switch 4b is not turned on, the calculated result of the equation (8) is used as the calibrated acceleration signal ACCV'.

In this way, the calibrated acceleration signal ACCV' is caused to have a the zero value at the idling position, to subsequently increase on the basis of the equation (8) in accordance with the depression of the accelerator pedal, and to have a the maximum at the maximum depression (i.e., WOT) position. As a result, the sensor deflection angle $\theta$ and the calibrated acceleration signal ACCV' exhibit characteristics like those of FIG. 3 and is common among the respective sensors.

The calibrated acceleration signal ACCV' thus obtained is stored in the memory of the processor so that it may be used later on as a controlling quantity for determining the throttle opening, the clutching and the speed changing timing.

As has been described hereinbefore, according to the present invention, in the construction using the potentiometer as the sensor of the accelerator pedal, the output voltage of the sensor is converted by the AD converter into the digital value, and this digital value is linearly corrected by the electronic control circuit through either the linear interpolation or the polynominal calculation. As a result, the nonlinearity of the output of the potentiometer can be improved to produce an accurate acceleration signal corresponding linearly to the depression of the accelerator pedal. Since the potentiometer can be used as the sensor of the accelerator pedal, it is possible to provide a signal processing system which enjoys a high resolution and which can be produced at a reasonable cost. Since the calculation can be achieved automatically by the central processing unit, the linearizing correction can be facilitated.

According to the present invention, on the other hand, since the calibrated signal is generated at a ratio to the acceleration signal obtained when the accelerator pedal is released, even with dispersion in the outputs of the respective sensors, the characteristic ratios between the acceleration signals and the deflection angles (or depressions) of the accelerator pedals can be equalized to make uniform the characteristics of the respective motor vehicles even without any adjustment of the vehicles.

Although the present invention has been described in connection with the embodiment thereof, it can be modified in various ways within the scope thereof such that the order of the linearizing correction and the proportional calibration of the resistance can be inverted, for example, which modification should not be excluded from the scope of the present invention.

What is claimed is:

1. A signal processing device for accelerating or decelerating a motor vehicle in response to a signal corresponding to a measured extent of depression of an accelerator pedal, said device comprising:

an accelerator pedal sensor coupled to the accelerator pedal and detecting the extent of depression of the accelerator pedal, said accelerator pedal sensor comprising a fixed resistance having a value R2 and a potentiometer including a sliding contact connected to a power supply outputting a voltage E, said fixed resistance being connected in series with said potentiometer sliding contact forming an output node, and an output signal being produced at the output node; and correction means, coupled to said accelerator pedal sensor, for correcting the output signal produced by said accelerator pedal sensor, the correction changing nonlinearly depending upon the extent of depression of said accelerator pedal to produce a corrected accelerator signal which varies linearly with respect to the actual accelerator pedal displacement, said correction means including:

an analog-to-digital converter for converting said output signal to a digital voltage value SD; and means for producing a corrected acceleration signal ACCV as a function of said digital voltage value SD, the value R2 of the fixed resistance R2, the value of the voltage E, and a constant C according to the following formula;

$$ACCV = C \times R2 \times SD/(10 \times E - SD).$$

2. A signal processing device for accelerating or decelerating a motor vehicle in response to a signal corresponding to a measured extent of depression of an accelerator pedal, said device comprising:

an accelerator pedal sensor coupled to the accelerator pedal and detecting the extent of depression of the accelerator pedal, said accelerator pedal sensor comprising a fixed resistance having a value R2 and a potentiometer including a sliding contact connected to a power supply outputting a voltage E, said fixed resistance being connected in series with said potentiometer sliding contact forming an output node, and an output signal being produced at the output node;

correction means, coupled to said accelerator pedal sensor, for correcting the output signal produced by said accelerator pedal sensor, the correction changing nonlinearly depending upon the extent of depression of said accelerator pedal to produce a corrected acceleration signal which varies linearly with respect to the actual accelerator pedal displacement, said correction means including:

an analog-to-digital converter for converting said output signal to a digital voltage value SD; and means for producing a corrected acceleration signal ACCV as a function of said digital voltage value SD, the value of the fixed resistance R2, the value of the voltage E, and a constant C according to the following formula;

$$ACCV = C \times R2 \times SD/(10 \times E - SD); \text{ and}$$

resistance correction means for correcting the resistance value of said fixed resistance and said potentiometer which varies, depending upon production characteristics, from an ideal value.

3. A signal processing device according to claim 2, further comprising:

a first switch connected to said correction means and detecting a maximum stroke of said accelerator pedal; and a second switch connected to said correction means and detecting the release of said accelerator pedal, said correction means correcting the inclination of said linearized acceleration signal variation in accordance with the detected release of said accelerator pedal.

4. A signal processing device for accelerating or decelerating a motor vehicle in response to a signal corresponding to a measured extent of depression of an accelerator pedal, said device comprising:

an accelerator pedal sensor coupled to the accelerator pedal and detecting the extent of depression of the accelerator pedal, said accelerator pedal sensor comprising a fixed resistance having a value R2 and a potentiometer including a sliding contact connected to a power supply outputting a voltage E, said fixed resistance being connected in series with said potentiometer sliding contact forming an output node, and an output signal being produced at the output node; and an idle switch, having contacts, positioned above the accelerator pedal, said contacts being closed when the accelerator pedal is not depressed, indicating an idling condition; and correction means connected to said accelerator pedal sensor for forming a linearized acceleration signal which varies linearly with respect to actual displacement of the accelerator pedal sensor, and for calibrating a change in resistance of said potentiometer to correct the acceleration signal, said correction means including;

an analog to digital converter for converting the output signal of said accelerator pedal sensor into a digital voltage value SD;

memory means for storing a polynominal $ACCV = C[C] \times R2 \times SD/(A \times [A]E - SD)$ for performing a linearlizing correction based on the value R2 of said fixed resistance, and the voltage E of the power supply based on the digital voltage value SD; and a central processing unit calculating a calibration coefficient COF when said idle switch is turned on in accordance with the following equation (1) on the basis of the polynominal, and for calculating a calibrated acceleration signal ACCV' in accordance with the following equation (2) from the calibration coefficient COF and linearized corrected acceleration signal ACCV of said analog to digital converter:

$$COF = B/ACCV_{[0]} \quad (1)$$

$$ACCV' = B - COF \times ACCV \quad (2)$$

5. A signal processing system as recited in claim 4, said central processing unit further comprising memory means for storing said acceleration signal, at an idling position where said accelerator is released, to determine a calibrated acceleration signal at a ratio of an actual acceleration signal obtained from said sensor to the stored value in said memory means.

6. A signal processing device according to claim 5, wherein a calibrated acceleration signal ACCV' has a 0 value at the idling position, increases on the basis of the following equation as said accelerator is actuated, and to take a maximum value at a maximum actuated position where said actuator is actuated to its full stroke;

$$ACCV' = B\text{-}COF \times ACCV,$$

where B designates the maximum output of said central processing unit, COF designates a calibration coefficient and ACCV is determined by the following equation:

$$ACCV = C \times R2 \times SD/(A \times E\text{-}SD),$$

where C designates a constant, R2 designates a resistance of said second resistance, SD designates the output of said analog to digital converter, A designates the output units of said analog digital converter, and E designates the voltage of said power supply.

* * * * *